(12) United States Patent
Fukumoto

(10) Patent No.: US 6,192,953 B1
(45) Date of Patent: Feb. 27, 2001

(54) HEAVY DUTY RADIAL TIRE HAVING TAPERED SHOULDER PORTIONS

(75) Inventor: Tetsuhiro Fukumoto, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 0 days.

(21) Appl. No.: 09/243,805

(22) Filed: Feb. 3, 1999

(30) Foreign Application Priority Data

Feb. 5, 1998 (JP) .................................................. 10-024823

(51) Int. Cl.$^7$ ............................ B60C 11/01; B60C 11/13; B60C 105/00
(52) U.S. Cl. ............................... 152/209.16; 152/209.18; 152/209.22
(58) Field of Search ........................ 152/209.16, 209.18, 152/209.22

(56) References Cited

U.S. PATENT DOCUMENTS

| 3,858,633 | * | 1/1975 | Boileau | 152/209.18 |
| 4,362,201 | * | 12/1982 | Zinnen et al. | 152/209.22 |
| 5,211,780 | * | 5/1993 | Kabe et al. | 152/209.16 |

FOREIGN PATENT DOCUMENTS

| 3615666 | * | 11/1986 | (DE) . | |
| 14404 | * | 8/1980 | (EP) | 152/209.16 |
| 5-51492 | * | 3/1993 | (JP) . | |
| 5-286310 | * | 11/1993 | (JP) | 152/209.16 |
| 6-166302 | * | 6/1994 | (JP) | 152/209.22 |

* cited by examiner

Primary Examiner—Steven D. Maki
(74) Attorney, Agent, or Firm—Birch, Stewart, Kolasch & Birch, LLP

(57) ABSTRACT

A heavy duty radial tire includes a pair of shoulder portions tapered at an angle $\alpha$ of from 40 to 50 degrees, a pair of zigzag main grooves extending circumferentially to form a pair of shoulder ribs, the shoulder ribs provided with lug grooves each having an axially inner end P1 terminated in the rib and an axially outer end opened at the tread edge TE, the bottom Ys of the lug grooves extending from the radially outer surface to the axially outer surface of the shoulder rib while inclining at an angle $\beta$, the height H1 of the tapered shoulder portion being in the range of from 50 to 67% of the depth Hg of the zigzag main grooves, the angle $\alpha$ at the tread edge TE being larger than the angle $\beta$ at the axially inner end P1, the distance LA between the axially inner end P1 and the zigzag main groove being in the range of from 0.95 to 1.15 times the minimum distance LB between the zigzag main groove and the tread edge TE, and the distance LD from the taper end 9e to the bottom Ys measured in parallel with the tread surface 2S being larger than the distance LC from the tread edge TE to the axially inner end P1.

2 Claims, 3 Drawing Sheets

HEAVY DUTY RADIAL TIRE HAVING TAPERED SHOULDER PORTIONS

FIELD OF THE INVENTION

The present invention relates to a pneumatic tire, more particularly to a heavy duty radial tire having an improved tread portion being capable of reducing uneven wear in tread shoulder regions without sacrificing the wandering performance and traction performance.

DISCUSSION OF RELATED ART

In general, heavy duty tires for construction vehicles such as dump trucks are provided with a rib-type tread pattern, wherein in order to obtain a good traction performance under off-road conditions, circumferentially extending main grooves are provided with a zigzag configuration and lateral grooves called lug groove are disposed in the axially outmost ribs or shoulder ribs. Further, in order to improve the wandering performance, the shoulder portions are tapered.

In such tires, due to zigzag main grooves and lug grooves, the fluctuation of the ground pressure distribution in the circumferential direction is relatively large in the shoulder ribs in particular. Therefore, uneven wear is liable to occur on both sides of the lug grooves in the circumferential direction and between the main groove and lug grooves, and as a result, the wear life is shortened.

This type of uneven wear may be reduced to some degree by changing the zigzag main groove into a straight configuration, and/or decreasing the length of lug grooves. In this case, however, road grip or traction greatly decreases.

On the other hand, as the shoulder portions are tapered, the length of the lug grooves is decreased, which also deteriorates the traction performance.

It is therefore, an object of the present invention to provide a heavy duty radial tire, especially for construction vehicle such as dump trucks, in which uneven wear of shoulder ribs is effectively improved without sacrificing the traction and wandering performances.

SUMMARY OF THE INVENTION

According to the present invention, a heavy duty radial tire comprises a tread portion with a pair of tread edges TE, a pair of tapered shoulder portions each extending axially outwardly and radially inwardly from one of the tread edges TE and having an slope angle $\alpha$ of from 40 to 50 degrees with respect to the normal direction to the tread surface 2S at the tread edge TE, a pair of circumferentially extending zigzag main grooves disposed in the tread portion so as to form a pair of shoulder ribs each defined between one of the zigzag main grooves and the adjacent tread edge TE, the shoulder ribs provided with lug grooves each having an axially inner end P1 terminated in the rib and an axially outer end opened at the tread edge TE, the lug grooves each having a bottom Ys extending from the radially outer surface to the axially outer surface of the shoulder rib while inclining at an angle $\beta$ with respect to the normal direction to the tread surface 2S at said axially inner end P1, the height H1 of the tapered shoulder portion measured from the taper end 9e thereof to the tread edge TE along the normal direction to the tread surface 2S at the tread edge TE being in the range of from 50 to 67% of the depth Hg of the zigzag main grooves, the angle $\alpha$ at the tread edge TE being larger than the angle $\beta$ at said axially inner end P1, the distance LA between said axially inner end P1 and the zigzag main groove being in the range of from 0.95 to 1.15 times the minimum distance LB between the zigzag main groove and the tread edge TE, each distance measured in the axial direction along the tread surface 2S, the distance LD from said taper end 9e to the bottom Ys of the lug groove measured in parallel with the tread surface 2S along the axial direction being larger than the distance LC from the tread edge TE to said axially inner end P1 measured in the axial direction along the tread surface.

BRIEF DESCRIPTION OF THE DRAWINGS

An embodiment of the invention will now described in detail in conjunction with the accompanying drawings.

DETAILED DESCRIPTION OF THE INVENTION

Figure 1:
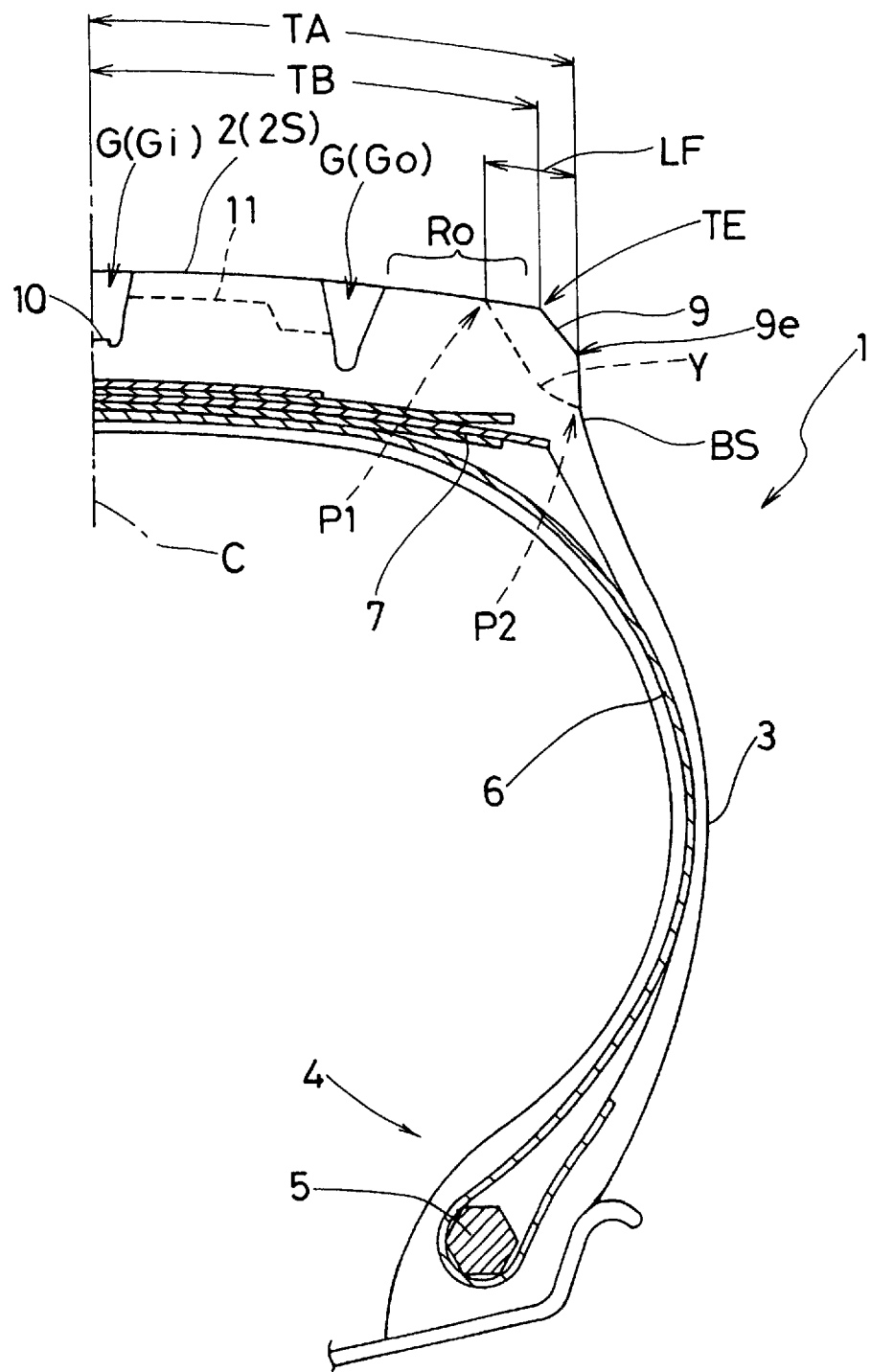
FIG. 1 is a cross sectional view of an embodiment of the present invention.

In FIG. 1, a heavy duty radial tire 1 according to the present invention, which is a 10.000R20 tire for dump trucks in this embodiment, comprises a tread portion 2 with axial edges TE, a pair of sidewall portions 3, a pair of bead portions 4 with a bead core 5 therein, a carcass 6 extending between the bead portions 4, and a belt 7 disposed radially outside the carcass 6 in the tread portion 2.

The carcass 6 comprises at least one ply of cords arranged at an angle of 70 to 90 degrees with respect to the tire equator C, each ply extending between the bead portions 4 and turned up around the bead core 5 in each bead portion 4 from the inside to the outside of the tire to be secured thereto. For the carcass cords, organic fiber cords, e.g. nylon, polyester, rayon, aromatic polyamide or the like, and inorganic cords, e.g. steel and the like, can be used. In this embodiment, the carcass 6 is composed of a single ply of steel cords arranged at about 90 degrees with respect to the tire equator C.

The belt 7 comprises at least two cross plies. In this embodiment, the belt 7 is composed of four plies: a radially innermost first ply which is made of cords laid at an inclination angle of from 40 to 60 degrees with respect to the tire equator C, and second, third and fourth plies each of which is made of cords laid at a small inclination angle of not more than 30 degrees with respect to the tire equator C.

In the tread portion 2, at least two zigzag main grooves Go extending continuously in the circumferential direction are disposed to from a shoulder rib Ro between each tread edge TE and the adjacent main groove Go. In this example, between the two main grooves Go, one zigzag main grooves Gi is further provided along the tire equator C.

The main grooves G are a deep groove having a depth Hg of at least 12.0 mm. The central main groove Gi is somewhat shallower than the axially outer main grooves Go, and platforms 10 protruding from the groove bottom at a small height are disposed therein to prevent stone trapping.

In this example, further, lateral grooves 11 are disposed to circumferentially divided the annular part between the central main groove Gi and each of the outer main grooves Go into a plurality of blocks. The lateral grooves 11 are preferably shallower and narrower than the main grooves G. It is however, possible to form the annular parts as a circumferentially continuous rib by not forming the lateral grooves 11.

As shown in FIG. 1, the tread portion 2 between the tread edges TE has a convex tread surface 2S. And on both side thereof, a tapered shoulder defined by a slope 9 extending axially outward and radially inward from the tread edge TE is provided to decrease the camber thrust (CT) to improve the wandering performance. The other end 9e of the slope 9 is connected to the radially outer end of the surface of the sidewall upper portion called buttress portion BS which is usually formed as a linear contour or a concave contour.

The inclination angle α of the slope 9 is 40 to 45 degrees with respect to the normal direction to the tread surface 2S at the tread edge TE.

The height H1 of the slope 9, which is measured between the outer end 9e and the tread edge TE along the normal direction to the tread surface at the tread edge TE, is 0.50 to 0.67 times the groove depth Hg of the longitudinal main groove Go.

If the angle α is smaller than 40 degrees and/or the slope height H1 is smaller than 0.50×Hg, it is difficult to suppress a wandering phenomenon. If the angle α is larger than 50 degrees and/or the slope height H1 is larger than 0.67×Hg, it becomes difficult for the undermentioned lug grooves Y to maintain a necessary volume, and the traction performance deteriorates.

Figure 2:
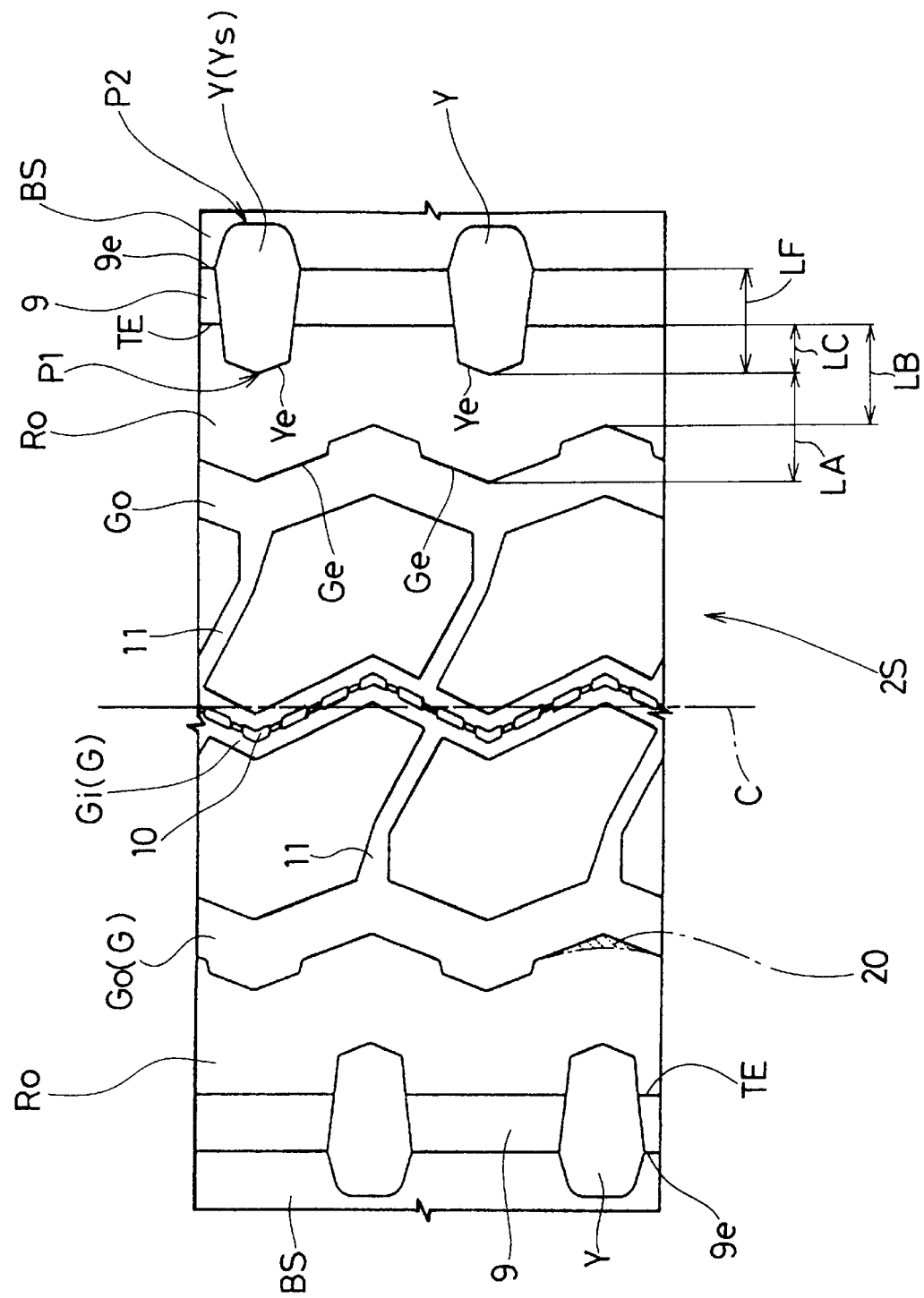
FIG. 2 is a developed plan view thereof showing an example of the tread pattern.

In each of the shoulder ribs Ro, a plurality of lug grooves Y are disposed. As shown in FIG. 2, the circumferential pitches of the lug grooves Y are substantially same as the zigzag pitches of the axially adjacent main groove Go, and the lug grooves Y are arranged to align with the axially inwardly projecting points of the zigzag.

As shown in FIG. 2, the distance LA from the inner end P1 to the main groove Go measured in the axial direction along the tread surface is in the range of from 0.95 to 1.15 times the minimum width LB of the shoulder rib Ro measured in the axial direction along the tread surface. From the viewpoint of traction performance, the distance ratio LA/LB can be further limited into the range of 1.00 to 1.15.

Because the length of the lug grooves Y is determined in relation to the zigzag amplitude of the main groove Go and the ratio LA/LB is substantially 1, it is possible to increase the zigzag amplitude and the lug grooves' length without increasing the variation in the ground contacting area of the shoulder ribs Therefore, the variation in the ground pressure is reduced, and uneven wear is effectively suppressed.

Further, in order to decrease the fluctuation of ground pressure distribution, the axially inner edge Ye of the lug groove Y is formed in a V-shape which is substantially parallel with the axially outer edge Ge of the main groove Go.

Figure 3:
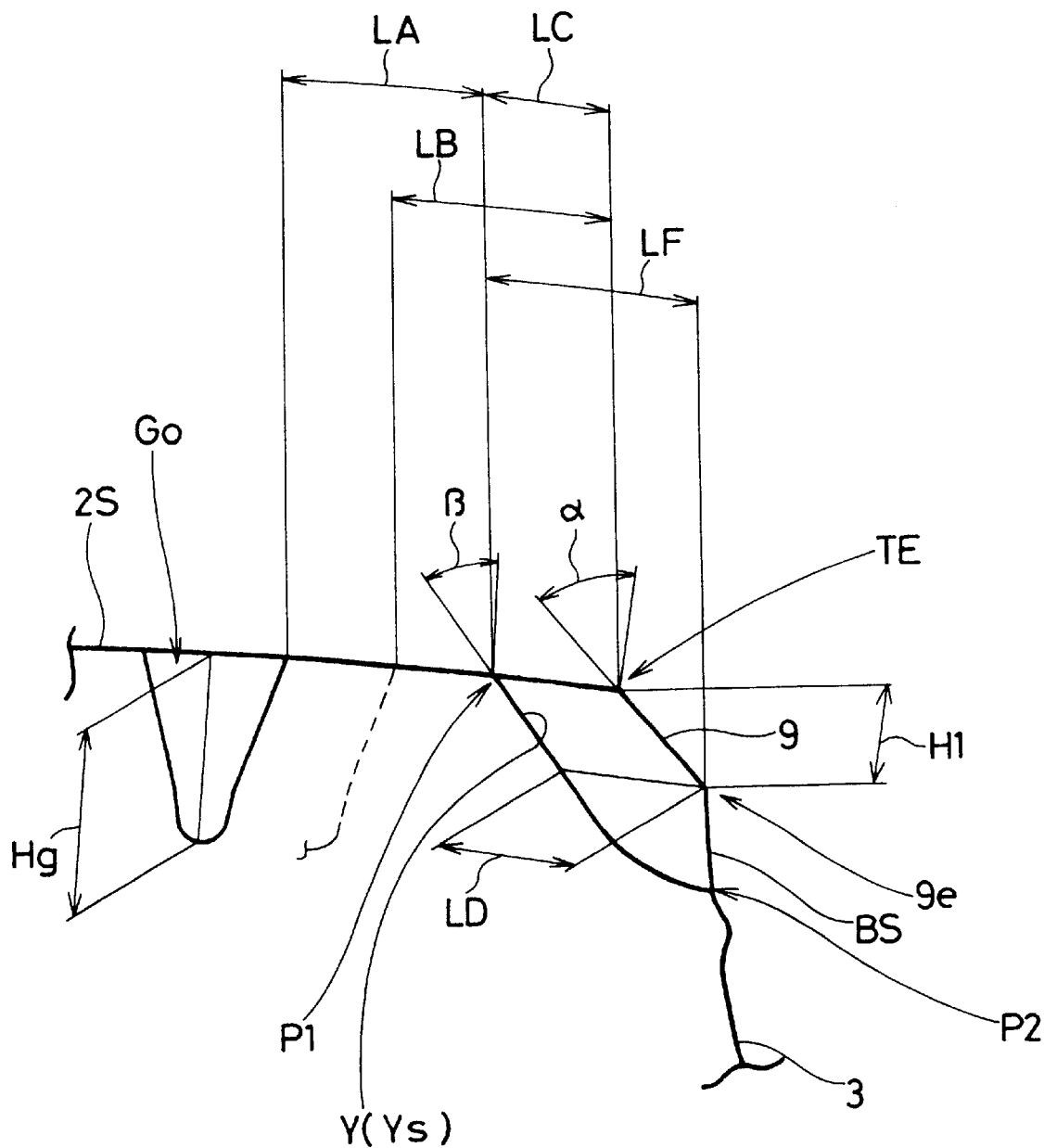
FIG. 3 is an enlarged sectional view of the shoulder portion thereof.

As to the bottom Ys of the lug groove Y, as shown in FIG. 3, the axially inner end thereof reaches to the above-mention inner end position P1 on the radially outer surface of the rib Ro. On the other hand, the axially outer end thereof reaches to a position P2 on the axially outer surface of the buttress portion BS.

The bottom Ys inclines at an angle β with respect to the normal direction to the tread surface 2S at the inner end position P1. The angle β at the inner end position P1 is smaller than the above-mentioned angle α at the tread edge TE. Further, the angle β is substantially constant (the value is in the range of from 35 to 45 degrees) from the inner end P1 to a position radially inward of the edge 9e, and then the angle β is gradually increased to the outer end P2.

The distance LD from the edge 9e to the groove bottom Ys measured axially in parallel with the tread surface 2S is larger than the distance LC from the tread edge TE to the inner end position P1 measured along the tread surface 2S, whereby the lug grooves' length on the tread surface gradually increases as the tread wear progresses, and it is possible to compensate for the decrease in traction due to the decreased lug groove depth. Therefore, the traction performance can be maintained for a long period of time.

Further, for the traction performance and uneven wear resistance, the ratio LA/LC of the distance LA and distance LC is preferably in the range of from 2.00 to 2.50, and the ratio LA/LF of the distance LA and the distance LF from the edge 9e to the inner end position P1 measured axially in parallel with the tread surface 2F is preferably in the range of from 0.9 to 1.1.

If the ratio LA/LB is less than 0.95, the ground pressure in the portion between the lug grooves Y and the main groove Go becomes too high, and the so called heel-and-toe wear occurs on both sides of the lug grooves Y in the circumferential direction. If the ratio LA/LB is more than 1.15, the ground pressure in the portion between the lug grooves Y and main groove Go becomes too low, and the axially inwardly projecting parts of the shoulder rib Ro wears faster (shaded area 20 in FIG. 2) which results in the so-called railway wear.

If the ratio LA/LC is less than 2.00, the ground pressure in the portion between the lug grooves Y and main groove Go is too high, and the so called heel-and-toe wear is likely to occur on both sides of the lug grooves Y in the circumferential direction. If the ratio LA/LC is more than 2.50, the length of the lug grooves Y becomes insufficient, and traction abruptly decreases.

If the ratio LA/LF is less than 0.9, the so called heel-and-toe wear is likely to occur on both sides of the lug grooves Y in the circumferential direction. If the ratio LA/LF is more than 1.1, the traction performance deteriorates.

In this example, further, as shown in FIG. 1, the distance TA of the outer edge 9e, and the distance TB of the tread edge TE, each measured axially from the tire equator C in parallel with the tread surface 2S, are set such that LF/TA is in the range of 0.25 to 0.30 and LF/TB is in the range of 0.25 to 0.30, whereby uneven wear including heel-and-toe wear can be effectively prevented. If the distances TA and TB are excessively large in comparison with the distance LF, the traction performance by the lug grooves is not exhibited sufficiently. If the distances TA and TB are excessively small, the ground pressure distribution is largely disturbed on the entire tread surface 2S, and uneven wear is caused.

Comparison Tests

Test tires of size 10.00R20 for dump trucks having the same internal structure shown in FIG. 1 were made and tested for wandering, traction, uneven wear resistance and wear resistance.

The specifications of the tires are given in Table 1.

Wandering and Traction Test

The test tires mounted on standard rims of size 8.25×24.5 and inflated to 830 kPa were attached to the front axle of a 2-DD type tractor head and run on rough roads. During running, the test driver evaluated wandering and traction by his feelings. The results are shown in Table 1 using an index based on Ref.1 being 100. The larger the value, the higher is the performance.

Uneven Wear Resistance and Wear Resistance Test

Using the same vehicle as above, the test tires were run on highway and expressway for 20,000 km.

As to the uneven wear resistance, the amount of the heel-and-toe wear occurred in the shoulder ribs Ro was measured.

As to the wear resistance, the amount of wear at the axially outer edge of the outer main groove Go was measured.

As the test results, the inverse number of the amount measured is indicated in Table 1 by using an index based of Ref.1 being 100. Thus, the larger the index, the higher the resistance.

TABLE 1

| Tire | Ex. 1 | Ref. 1 | Ref. 2 | Ref. 3 |
|---|---|---|---|---|
| Shoulder portion | taper | taper | round | square |
| angle α (deg.) | 46 | 60 | — | — |
| height H1 (mm) | 10 | 5.8 | — | — |
| Lug groove | | | | |
| angle β (deg.) | 30 | 30 | | |
| α/β | 1.53 | 2 | — | — |
| Main groove | | | | |
| depth Hg (mm) | 18.2 | 18.2 | 18.2 | 18.2 |
| H1/Hg | 0.55 | 0.32 | — | — |
| LA (mm) | 29.5 | 24 | 29.5 | 24 |
| LB (mm) | 27 | 27 | 27 | 27 |
| LC (mm) | 13.2 | 19.5 | — | 28.9 |
| LD (mm) | 14.5 | 17 | 14.5 | 17 |
| LF (mm) | 28.9 | 28.9 | 28.9 | 28.9 |
| TA (mm) | 113 | 113 | 113 | 113 |
| TB (mm) | 103 | 103 | — | — |
| LA/LB | 1.09 | 0.88 | 1.09 | 0.88 |
| LD/LC | 1.1 | 0.87 | — | 0.59 |
| LA/LC | 2.23 | 1.23 | — | 0.83 |
| LA/LF | 1.02 | 0.83 | 1.02 | 0.83 |
| LF/TA | 0.26 | 0.26 | 0.26 | 0.26 |
| LF/TB | 0.28 | 0.28 | — | — |
| Test results | | | | |
| Wandering | 105 | 100 | 100 | 84 |
| Traction | 95 | 100 | 71 | 76 |
| Uneven wear resistance | 111 | 100 | 94 | 122 |
| Wear resistance | 106 | 100 | 90 | 96 |

As described above, in the heavy duty radial tires according to the present invention, uneven wear in the shoulder ribs can be effectively reduced wile maintaining the traction performance and anti-wandering performance in a good level.

What is claimed is:

1. A heavy duty radial tire comprising a tread portion with a pair of tread edges, a pair of tapered shoulder portions each extending axially outwardly and radially inwardly from one of the tread edges and having a slope defining an angle α of from 40 to 50 degrees with respect to the normal direction to a tread surface at a tread edge, a pair of circumferentially extending zigzag main grooves disposed in the tread portion so as to forma pair of shoulder ribs each defined between one of the zigzag main grooves and the adjacent tread edge, the shoulder ribs provided with lug grooves each having an axially inner end terminated in the rib and an axially outer end opened at the tread edge, the lug grooves each having a bottom extending from the radially outer surface to the axially outer surface of the shoulder rib while inclining at an angle β with respect to the normal direction to the tread surface at said axially inner end, a height of the tapered shoulder portion measured from a taper end thereof to the tread edge along the normal direction to the tread surface at the tread edge being in the range of from 50 to 67% of a depth of the zigzag main grooves, the angle α at the tread edge being larger than the angle β said axially inner end, a distance LA between said axially inner end and the zigzag main groove being in the range of from 0.95 to 1.15 times a minimum distance LB between the zigzag main groove and the tread edge each distance measured in the axial direction along the tread surface, a distance LD from said taper end to the bottom of the lug groove measured in parallel with the tread surface along the axial direction being larger than a distance LC from the tread edge to said axially inner end measured in the axial direction along the tread surface wherein, said angle β is substantially constant from said axially inner end to a position radially inward of said taper end and the value thereof is in the range of from 35 to 45 degrees, and then from said position to said taper end, the angle β gradually increases.

2. The heavy duty radial tire according to claim 1, wherein the ratio LA/LC of said distance LA to said distance LC is in the range of from 2.00 to 2.50, and the ratio LA/LF of said distance LA to a distance LF between said taper end and said axially inner end measured in parallel with the tread surface along the axial direction is in the range of from 0.9 to 1.1.

* * * * *